(12) United States Patent
Arun Koteeswaran et al.

(10) Patent No.: US 12,455,932 B2
(45) Date of Patent: Oct. 28, 2025

(54) PREDICTIVE FEEDBACK ENGINE FOR IMPROVING SEARCH RELEVANCE IN A TENANT CONFIGURABLE HYBRID SEARCH SYSTEM

(71) Applicant: WORKDAY, INC., Pleasanton, CA (US)

(72) Inventors: Karthik Arun Koteeswaran, Dublin, CA (US); Vivek Kumar, Fremont, CA (US)

(73) Assignee: WORKDAY, INC., Pleasanton, CA (US)

( * ) Notice: Subject to any disclaimer, the term of this patent is extended or adjusted under 35 U.S.C. 154(b) by 8 days.

(21) Appl. No.: 18/343,829

(22) Filed: Jun. 29, 2023

(65) Prior Publication Data
US 2025/0005082 A1      Jan. 2, 2025

(51) Int. Cl.
*G06F 16/953*      (2019.01)

(52) U.S. Cl.
CPC .................................. *G06F 16/953* (2019.01)

(58) Field of Classification Search
None
See application file for complete search history.

(56) References Cited

U.S. PATENT DOCUMENTS

| | | | |
|---|---|---|---|
| 11,106,736 B1* | 8/2021 | Newman | G06N 5/022 |
| 11,657,265 B2* | 5/2023 | Gebre | G06N 3/048 706/15 |
| 11,741,191 B1* | 8/2023 | Zilka | G06N 3/045 706/12 |
| 11,769,016 B2* | 9/2023 | Theobald | G06F 18/24 704/9 |
| 2022/0383066 A1* | 12/2022 | Anicic | G06N 5/02 |

* cited by examiner

*Primary Examiner* — Debbie M Le
(74) *Attorney, Agent, or Firm* — James J. DeCarlo; Greenberg Traurig, LLP (57) ABSTRACT

In some implementations, the techniques described herein relate to a method including: loading, by a processor, a predictive model, the predictive model including a first set of hidden layers; loading, by the processor, a semantic model, the semantic model including a second set of hidden layers; generating, by the processor, a tenant model using the first set of hidden layers and a third set of hidden layers, the third set of hidden layers receiving, as input, an output of the first set of hidden layers; loading, by the processor, a tenanted training data set; training, by the processor, the tenant model by biasing the first set of hidden layers with the second set of hidden layers and training weights of at least the third set of hidden layers using the tenanted training data set; and building, by the processor, an embedding index using the tenant model.

20 Claims, 5 Drawing Sheets

PREDICTIVE FEEDBACK ENGINE FOR IMPROVING SEARCH RELEVANCE IN A TENANT CONFIGURABLE HYBRID SEARCH SYSTEM

BACKGROUND

The relevancy of search results is not a static or global measure. The results returned by a search engine can, and do, change based on user preferences in interests. Current approaches that use, as an example, term frequency (e.g., the number of times a search term appears in a document as a proxy for relevance) often yield sub-optimal results. Even attempts to utilize word embeddings to provide "semantic" search results often cannot provide highly personalized results.

DETAILED DESCRIPTION

The example embodiments solve the above technical problems in the state of search engine relevancy by providing a system that leverages tenant- and user-specific embeddings to improve the relevancy based on semantic similarity. The search system, rather than surfacing primitive results based on term frequency and basic embeddings utilizes predictive analytics driven by deep learning and neural networks. Rather than having an isolated focus, the system merges personalization, semantical sense, and predictive analytics to determine relevance. The search system is additionally highly configurable, hybrid, and scalable and delivers very high accuracy and recall rate when handling search queries.

In some implementations, the techniques described herein relate to a method including: loading, by a processor, a predictive model, the predictive model including a first set of hidden layers; loading, by the processor, a semantic model, the semantic model including a second set of hidden layers; generating, by the processor, a tenant model using the first set of hidden layers and a third set of hidden layers, the third set of hidden layers receiving, as input, an output of the first set of hidden layers; loading, by the processor, a tenanted training data set; training, by the processor, the tenant model by biasing the first set of hidden layers with the second set of hidden layers and training weights of at least the third set of hidden layers using the tenanted training data set; and building, by the processor, an embedding index using the tenant model.

In some implementations, the techniques described herein relate to a method, wherein the tenanted training data set includes a data set including interactions of users with a network search application.

In some implementations, the techniques described herein relate to a method, wherein the interactions include search queries and corresponding selections of search results.

In some implementations, the techniques described herein relate to a method, wherein biasing the first set of hidden layers with the second set of hidden layers includes adjusting bias terms of the first set of hidden layers with corresponding bias terms of the second set of hidden layers.

In some implementations, the techniques described herein relate to a method, wherein biasing the first set of hidden layers with the second set of hidden layers includes combining the second set of hidden layers with the first set of hidden layers.

In some implementations, the techniques described herein relate to a method, further including analyzing a size of the tenanted training data set and determining which layers in the tenant model to re-train based on the size of the tenanted training data set.

In some implementations, the techniques described herein relate to a method, wherein training the tenant model further includes re-training the first set of hidden layers when the size is below a threshold.

In some implementations, the techniques described herein relate to a method, further including receiving a search query; converting the search query to a search embedding; building a search embedding from the search query; identifying similar embeddings stored in the embedding index; querying a document index using the search query to identify responsive documents; and returning a set of search results selected from the similar embeddings and responsive documents.

In some implementations, the techniques described herein relate to a non-transitory computer-readable storage medium for tangibly storing computer program instructions capable of being executed by a computer processor, the computer program instructions defining steps of: loading a predictive model, the predictive model including a first set of hidden layers; loading a semantic model, the semantic model including a second set of hidden layers; generating a tenant model using the first set of hidden layers and a third set of hidden layers, the third set of hidden layers receiving, as input, an output of the first set of hidden layers; loading a tenanted training data set; training the tenant model by biasing the first set of hidden layers with the second set of hidden layers and training weights of at least the third set of hidden layers using the tenanted training data set; and building an embedding index using the tenant model.

In some implementations, the techniques described herein relate to a non-transitory computer-readable storage medium, wherein the tenanted training data set includes a data set including interactions of users with a network search application.

In some implementations, the techniques described herein relate to a non-transitory computer-readable storage medium, wherein the interactions include search queries and corresponding selections of search results.

In some implementations, the techniques described herein relate to a non-transitory computer-readable storage medium, wherein biasing the first set of hidden layers with the second set of hidden layers includes adjusting bias terms of the first set of hidden layers with corresponding bias terms of the second set of hidden layers.

In some implementations, the techniques described herein relate to a non-transitory computer-readable storage medium, wherein biasing the first set of hidden layers with the second set of hidden layers includes combining the second set of hidden layers with the first set of hidden layers.

In some implementations, the techniques described herein relate to a non-transitory computer-readable storage medium, further including analyzing a size of the tenanted training data set and determining which layers in the tenant model to re-train based on the size of the tenanted training data set.

In some implementations, the techniques described herein relate to a non-transitory computer-readable storage medium, wherein training the tenant model further includes re-training the first set of hidden layers when the size is below a threshold.

In some implementations, the techniques described herein relate to a non-transitory computer-readable storage medium, the steps further including: receiving a search query; converting the search query to a search embedding; building a search embedding from the search query; identifying similar embeddings stored in the embedding index; querying a document index using the search query to identify responsive documents; and returning a set of search results selected from the similar embeddings and responsive documents.

In some implementations, the techniques described herein relate to a device including: a processor; and a storage medium for tangibly storing thereon logic for execution by the processor, the logic including instructions for: loading a predictive model, the predictive model including a first set of hidden layers; loading a semantic model, the semantic model including a second set of hidden layers; generating a tenant model using the first set of hidden layers and a third set of hidden layers, the third set of hidden layers receiving, as input, an output of the first set of hidden layers; loading a tenanted training data set; training the tenant model by biasing the first set of hidden layers with the second set of hidden layers and training weights of at least the third set of hidden layers using the tenanted training data set; and building an embedding index using the tenant model.

In some implementations, the techniques described herein relate to a device, wherein biasing the first set of hidden layers with the second set of hidden layers includes adjusting bias terms of the first set of hidden layers with corresponding bias terms of the second set of hidden layers.

In some implementations, the techniques described herein relate to a device, wherein biasing the first set of hidden layers with the second set of hidden layers includes combining the second set of hidden layers with the first set of hidden layers.

In some implementations, the techniques described herein relate to a device, further including analyzing a size of the tenanted training data set and determining which layers in the tenant model to re-train based on the size of the tenanted training data set.

Figure 1:
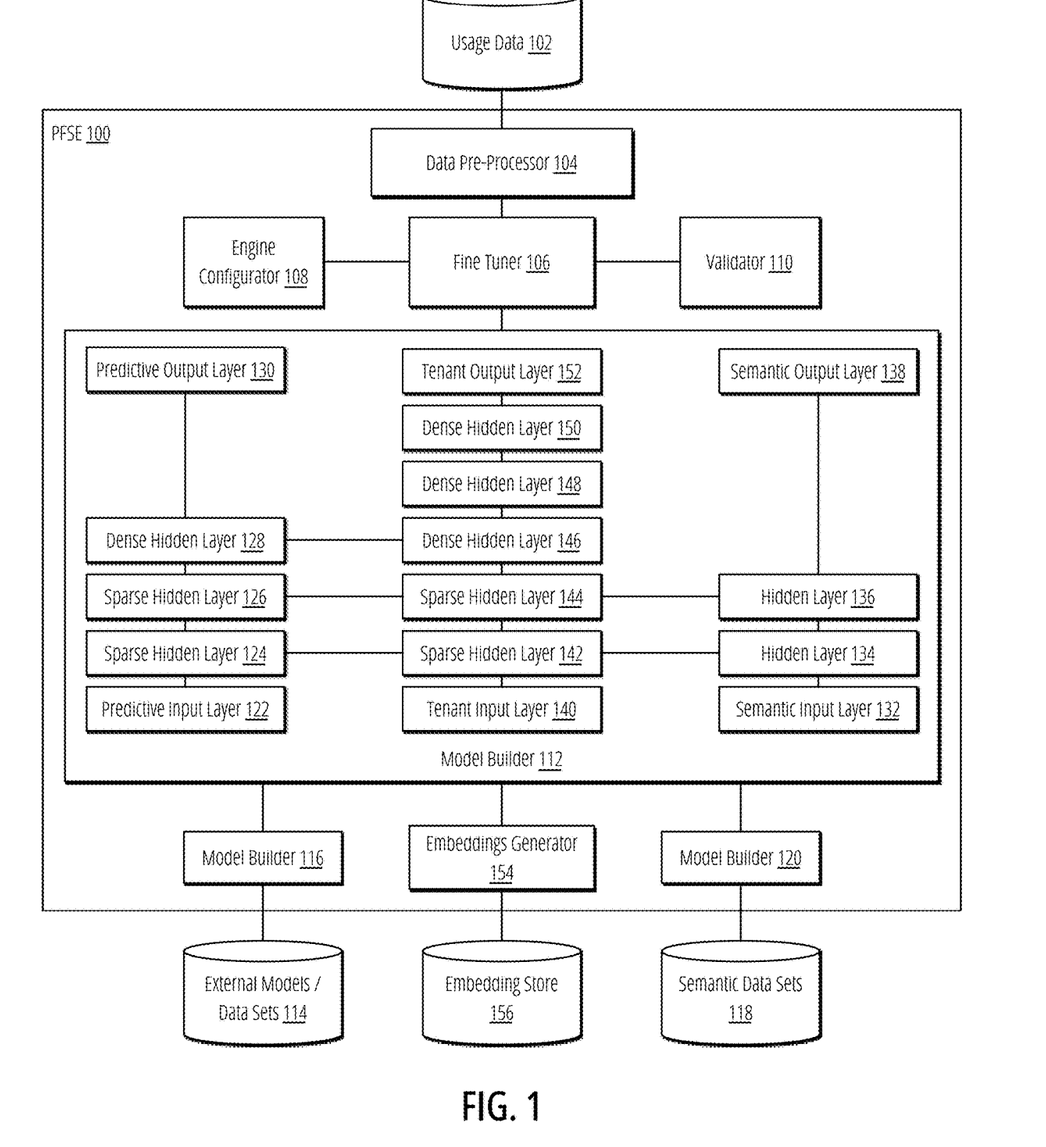
FIG. 1 is a block diagram illustrating a predictive feedback and semantic engine (PFSE) according to some of the example embodiments.

FIG. 1 is a block diagram illustrating a PFSE according to some of the example embodiments.

In FIG. 1, a PFSE 100 is configured to train and utilize a predictive model for generating search embeddings for storage in embedding store 156. In an implementation, the PFSE 100 can be implemented as a single computing device including a storage medium for tangibly storing thereon logic for execution by the processor, such as that depicted in FIG. 5. In some implementations, this storage medium can comprise a non-transitory computer-readable storage medium for tangibly storing computer program instructions capable of being executed by a computer processor of the device. In other implementations, PFSE 100 can be implemented as a network of computing devices or as a virtualized (e.g., container) system. The functional characteristics of PFSE 100 are described more fully in FIG. 3 and are not repeated herein but are summarized briefly. The various subcomponents of PFSE 100 may be implemented either as hardware devices or as software running on a computing device.

PFSE 100 includes a model builder 112. In some implementations, the model builder 112 generates a tenant model. In some implementations, this tenant model can comprise a neural network. In some implementations, the neural network can comprise a deep neural network having multiple layers. In some implementations, these layers can include an input layer, output layer, and one or more hidden layers. Various neural network models can be used including, without limitation, feedforward neural networks, convolutional neural networks, recurrent neural networks, transformer models, attention-based models, gated recurrent unit networks, autoencoders, generative adversarial networks, self-organizing maps, etc.

In the illustrated example, model builder 112 can build (i.e., train) a tenant model. In some implementations, the tenant model can include an input layer (e.g., tenant input layer 140) that receives a query embedding (i.e., vector) as an input and an output layer (e.g., tenant output layer 152) that outputs a result or action embedding. The tenant model can further include one or more hidden layers, including sparse hidden layer 142, sparse hidden layer 144, dense hidden layer 146, dense hidden layer 148, and dense hidden layer 150. The specific number of layers is non-limiting, and the types of layers is non-limiting. Indeed, some aspects of the layers may only be constrained by the corresponding layers of the predictive model and semantic model (discussed next).

In some implementations, PFSE 100 include two preliminary model builders including model builder 116 and model builder 120. In some implementations, these model builders can build or load predictive models (e.g., neural networks) from external sources such as external data store 114 or semantic datasets 118. In general, model builder 116 and model builder 120 build or load separate neural networks for performing separate tasks. Generally, model builder 116 can load or build a predictive model that can predict the same type of output as tenant output layer 152. For example, model builder 116 can load a general purpose query-result predictive model from external data store 114. As illustrated, this predictive model can include predictive input layer 122 and predictive output layer 130. Similar to the tenant model, the predictive model can include multiple hidden layers such as sparse hidden layer 124, sparse hidden layer 126, and dense hidden layer 128. Again, the specific organization of layers is not limiting. In some implementations, the layers of the predictive model can drive the organization of the tenant model layers. As illustrated, sparse hidden layer 124, sparse hidden layer 126, and dense hidden layer 128 can be used to define the initial set of hidden layers of the tenant model (sparse hidden layer 142, sparse hidden layer 144, and dense hidden layer 146). As discussed in FIG. 3, these correspondences can be implemented as "copying" the weights and biases from the predictive model to the tenant model.

In addition to the predictive model, model builder 120 can generate a semantic model that includes, as an example, a semantic input layer 132, a semantic output layer 138, and one or more hidden layers (e.g., hidden layer 134 and hidden layer 136). The semantic model can comprise any model capable of generating an output value that correlates the underlying semantic meaning of its input data. For example, the semantic model can be a text classification model, named entity recognition model, question-answering model, text generation model, semantic similarity model, sentiment analysis model, or similar types of models. As illustrated, the hidden layers of the semantic model can influence the biases of the corresponding hidden layers of the tenant model. For example, hidden layer 134 can influence the bias of sparse hidden layer 142 and hidden layer 136 can influence the bias of sparse hidden layer 144. In some implementations, this influencing can comprise replacing the bias term of the tenant model layers or concatenating or combining the semantic layers and the predictive layers.

As illustrated, some layers of the tenant model are not correlated with either the predictive model or the semantic model. For example, dense hidden layer 148 and dense hidden layer 150 have no correspondence. These layers can be created when defining the topology of the model. In some implementations, engine configurator 108 can be responsible for defining the amount and hyperparameters of these layers. In some implementations, this determination can be based on a training data size (discussed herein).

PFSE 100 further includes a fine tuner 106. In some implementations, fine tuner 106 is responsible for managing the training of model builder 112. Fine tuner 106 can read training parameters (e.g., learning rate, batch size, and number of training epochs) and train the tenant model. In some implementations, fine tuner 106 can selectively train specific layers of model builder 112. For example, based on the configuration output by engine configurator 108, fine tuner 106 can freeze some layers which prevent updates to layer weights and biases during backpropagation. PFSE 100 also includes a validator 110. In some implementations, validator 110 can be configured to monitor a loss function (e.g., mean squared error, cross-entropy, etc.) and validate the accuracy of the model builder 112.

PFSE 100 receives training data from usage data 102. In some implementations, usage data 102 can comprise interaction data recorded from user interactions with a search engine. In some implementations, these interactions can include selections, clicks, or other interactions with search results. In some implementations, the data in usage data 102 includes a query and corresponding interaction and/or selected search result. In some implementations, data pre-processor 104 reads raw data from usage data 102 and can convert the data into training data for fine tuner 106 to train the model. For example, data pre-processor 104 can convert query and result data into separate embeddings for use during training.

After model builder 112 is trained it can be used by embeddings generator 154. In some implementations, the tenant model takes a query embedding and generates an action embedding (e.g., a search result or action thereon) as an output. In some implementations, during training the embeddings generator 154 may utilize a subset of all available query/action pairs. In this scenario, the embeddings generator 154 can input the remaining pairs into the trained tenant model generate action embeddings. The embeddings generator 154 can then persist the query and action embeddings in a store 156 for later indexing. No limit is placed on the number of embeddings that can be stored in this manner. In some implementations, the query and result/action embeddings are stored in a vector space to enable searching based on an input embedding (e.g., query embedding).

Figure 2:
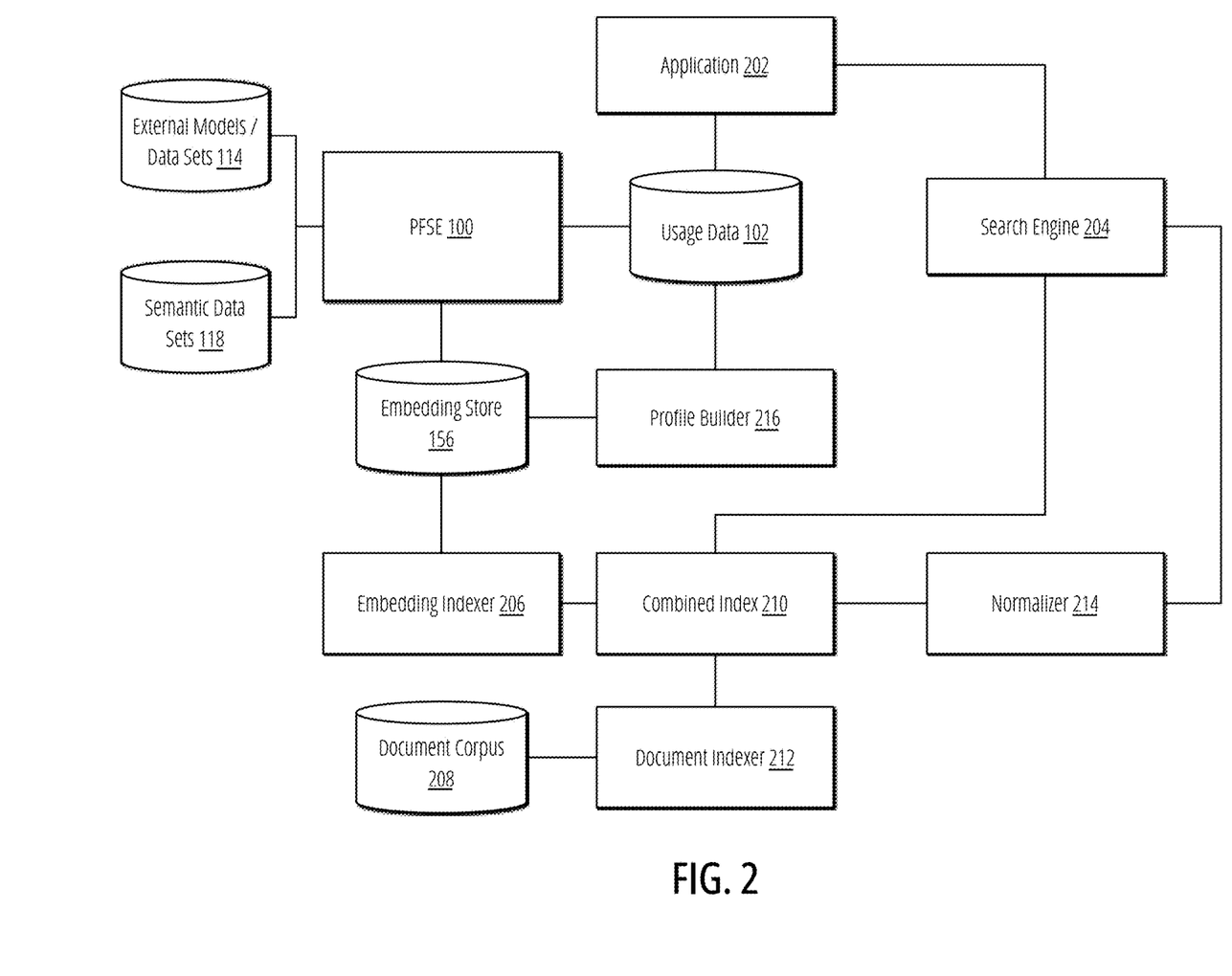
FIG. 2 is a block diagram illustrating a search system according to some of the example embodiments.

FIG. 2 is a block diagram illustrating a search system according to some of the example embodiments.

Various elements of FIG. 2 bearing the same reference numbers as that depicted in FIG. 1 are not described again herein. In the illustrated implementation, PFSE 100 can be utilized in connection with application 202. In some implementations, application 202 can comprise a web, mobile, desktop, or other type of application. For example, application 202 can comprise a web-based job search application or e-commerce website. In some implementations, application 202 can communicate with a search engine 204 to respond to search queries. In some implementations, each search query can comprise a text string entered by a user.

The system includes a profile builder 216 that can generate a user profile embedding for a given user. In some implementations, this embedding can be created using interaction data of the user stored in usage data 102. In some implementations, user profile embeddings can also be stored in store 156 and used during search operations, as will be discussed.

In some implementations, an embedding indexer 206 can access the embedding space stored in store 156. In some implementations the embedding indexer 206 can generate a searchable index of all embeddings stored in store 156. In some implementations, an approximate nearest neighbor (ANN) search algorithm can be used as an indexing algorithm. ANN search allows for efficient similarity-based retrieval by finding the nearest neighbors to a given query embedding in a high-dimensional space. In some implementations, k-d trees, ball trees, or locality-sensitive hashing (LSH) can be used as an index structure, although alternative structures can be used. During search, discussed next, a search engine can then utilize the nearest neighbor search algorithm provided by the index structure to find the closest embeddings (search results) to the query embedding.

In combination with embedding indexer 206, a document indexer 212 can generate an index of documents stored in a document corpus 208. In some implementations, these documents further correspond to result embeddings stored in store 156. In some implementations, the document indexer 212 can utilize an inverted index, term-document matrix, n-gram index, or similar type of index to index documents.

In some implementations, a combined index 210 can store both the embedding index and the document index. In some implementations, the combined index 210 can receive queries and return results to a normalizer 214. Specifically, the combined index 210 can receive a query, convert the query to a search embedding and find the closest result embeddings. The combined index 210 can also use the original text query to query the document index and identify a set of related documents.

Normalizer 214 can receive both sets of results and blend the embedding results with the document results. In some implementations, the search engine 204 can return a results page that includes both results identified via embeddings and those identified via text searching. In some implementations, the search engine 204 can interleave the results without an indication of the origin of the search results. In other implementations, the search results can be bifurcated, and each section can include corresponding document or embedding results. In some implementations, normalizer 214 can pre-process the results to prioritize results returned from the embedding store versus results from the document index, or vice-versa. In some implementations, this percentage can be specified by the tenant or an administrator thereof. For example, a tenant may specify that only 10% of results be pulled from the embedding store. In this scenario, normalizer 214 can only select a subset of the embeddings to include. In any scenario, both the results from the embedding store and the results from the document index can be normalized to be ranked on the same scale to facilitate comparisons among the results.

Figure 4:
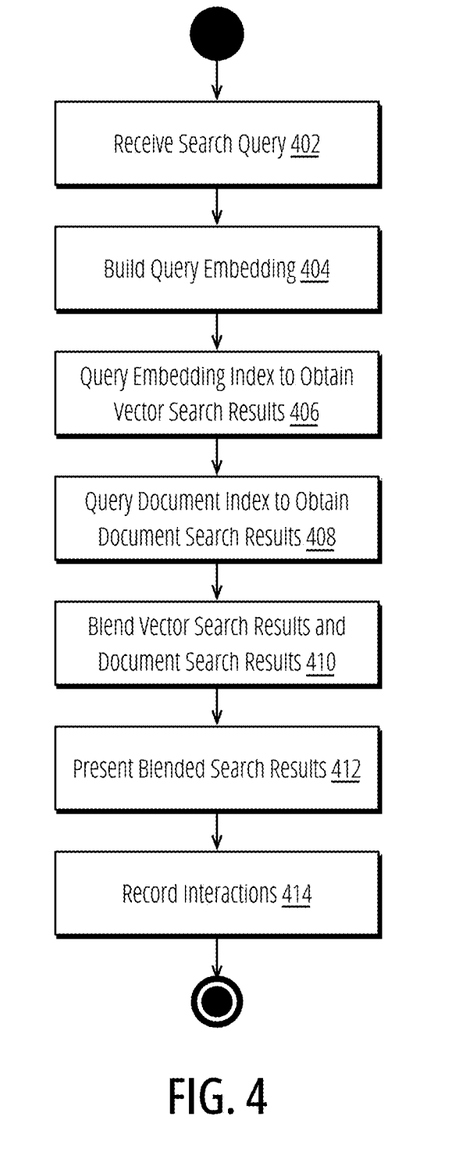
FIG. 4 is a block diagram illustrating a method for identifying blended search results according to some of the example embodiments.

Further functional details of the above system are described more fully in connection with FIG. 4 which are not repeated herein.

Figure 3:
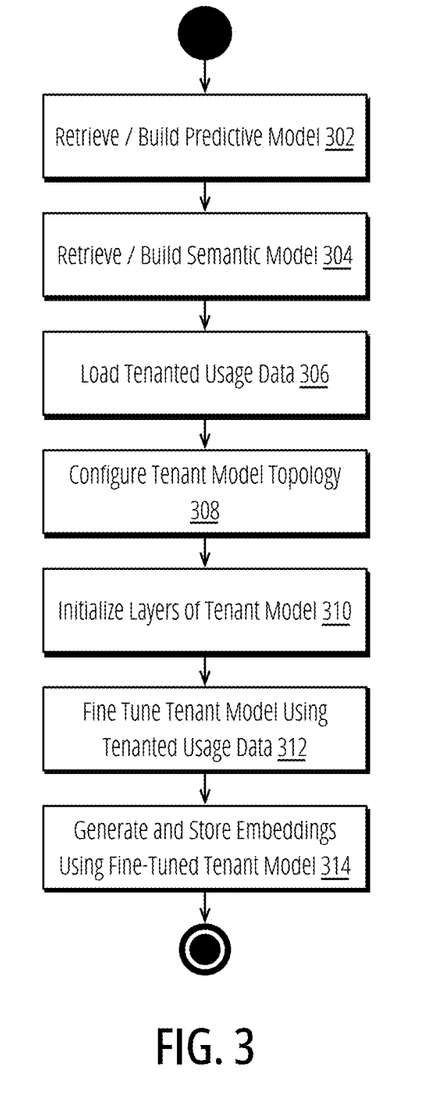
FIG. 3 is a block diagram illustrating a method for training a tenant model according to some of the example embodiments.

FIG. 3 is a block diagram illustrating a method for training a tenant model according to some of the example embodiments.

In step 302, the method can include retrieving or, as necessary, building a predictive model.

In some implementations, the predictive model can comprise a neural network. In some implementations, the neural network can comprise a deep neural network having multiple layers. In some implementations, these layers can include an input layer, output layer, and one or more hidden layers. In some implementations, the hidden layers can be sparse layers or dense layers and the layers can include combination of different types of hidden layers. Various neural network models can be used including, without limitation, feedforward neural networks, convolutional neural networks, recurrent neural networks, transformer models, attention-based models, gated recurrent unit networks, auto-encoders, generative adversarial networks, self-organizing maps, etc.

In some implementations, the method can include retrieving a model from an external data source. In some implementations, a given model can be represented as a set of parameters defining the properties of the layers and individual neurons. For example, a model can be stored in a specialized file format (e.g., SavedModel in Tensor Flow, PyTorch files, pickle modules, checkpoint files, etc.). In this scenario, the method can retrieve the model parameters and "rehydrate" the model to obtain a functioning model.

Alternatively, or in conjunction with the foregoing, the method can include building a new model. In this scenario, the method can obtain a dataset for training from an external data provider. For example, an external data provider may provide training data such as job search queries and applied for jobs or shopping search queries and purchased items. In general, the format may match this general format: query and selected item and the specific domain (e.g., jobs, shopping, etc.) is not limiting.

In some implementations, the method can be configured to train layers of a multi-layer perceptron (MLP) feedforward neural network, although the specific model is not limiting. In this scenario, the query/result combination can be used as training data wherein both are converted to embedding representations (e.g., using Word2Vec, GloVE or similar embedding models). The model can then be trained using query embeddings as input and the selected results as output vectors.

In some implementations, the specific number of hidden layers, the number of neurons in a layer, and the type of activation functions (represented as hyperparameters) of the predictive model used or generated in step 302 may be determined based on experimentation and are not limiting. In some implementations, these hyperparameters can be programmatically analyzed and chosen during training and validation of the model.

In step 304, the method can include retrieving or, as necessary, building a semantic model.

Similar to step 302, in some implementations, the method can retrieve a semantic model from an external source. The semantic model can comprise any model capable of generating an output value that correlates the underlying semantic meaning of its input data. For example, the semantic model can be a text classification model, named entity recognition model, question-answering model, text generation model, semantic similarity model, sentiment analysis model, or similar types of models. For each model, input text is converted to embeddings and input into the model. Like the predictive model, the semantic model can comprise a neural network. In some implementations, the neural network can comprise a deep neural network having multiple layers. In some implementations, these layers can include an input layer, output layer, and one or more hidden layers. In some implementations, these hidden layers may be either sparse or dense, or a combination thereof.

In some implementations, the method can include retrieving a semantic model from an external data source. In some implementations, a given semantic model can be represented as a set of parameters defining the properties of the layers and individual neurons. For example, a semantic model can be stored in a specialized file format (e.g., SavedModel in Tensor Flow, PyTorch files, pickle modules, checkpoint files, etc.). In this scenario, the method can retrieve the semantic model parameters and "rehydrate" the semantic model to obtain a functioning semantic model. In other embodiments, like the predictive model, the semantic model can be built from an external data set. Details of building a semantic model are similar to that of the predictive model and are not repeated herein.

In some implementations, the layers of the semantic and predictive models can be chosen such that they are similar. For example, both models can be selected such that the first two layers correspond to sparse layers. Further, in some implementations, the size of layers may be selected to be identical such that at least some layers of the predictive model are structurally the same as corresponding layers of the semantic model (although the weights and biases may of course differ).

In step 306, the method can include loading tenanted usage data.

In some implementations, a given application (e.g., web, mobile, desktop) can generate usage data. Usage data generally refers to interactions of a user or client device with the given application. In some implementations, the usage data can be defined on a per-tenant basis. As used herein, a tenant refers to an organization or other grouping of users utilizing the given application. In some implementations, the interactions can include interactions of a user in response to a search query. For example, the given application may return search results responsive to a query and the usage data may include interactions such as clicking or selecting a result, modifying a search item, performing an action after receiving a search result, selecting a next or previous control (when paginated), etc. In some implementations, a given item of tenanted usage data can thus include a search query and one or more interactions. In some implementations, the tenanted usage data can be pre-processed such that is forms a list of vectors, each vector including the search query (e.g., as an embedding) and an output vector (e.g., an embedding representing the action taken). In this scenario, a single query can be associated with one or more action embeddings.

In general, any pre-processing can be employed. However, it should be noted that the pre-processing should be done such that the format matches the input formats used to build the predictive and semantic models.

In step 308, the method can include configurating a topology of a tenant model.

In some implementations, the topology can be selected programmatically. In some implementations, the topology can be first selected based on the corresponding layers of the predictive model and the semantic model. For example, if the semantic and predictive models include two hidden layers, the method can select (as an initial set of layers) create two corresponding hidden layers in a tenant model. In some implementations, the method can then next analyze the remaining layers of the predictive model and/or semantic model and create corresponding hidden layers. In this manner, the method can include "mimicking" the predictive and semantic layers in the tenant model. In some implementations, the method can include not only creating the layer but specifying the properties of the layers as discussed next.

In addition to mimicking the predictive and semantic layers, the method can also include adding additional layers to the tenant model. In some implementations, these layers may comprise dense hidden layers, although other layer types may be added. In some implementations, these additional layers may not correspond to layers of the predictive and semantic models. In some implementations, the number of additional layers can be selected as a function of the tenanted usage data. For example, the method can analyze the size (e.g., volume) of the training data (i.e., tenanted usage data) and determine how many additional hidden layers are required. In some implementations, the method can bucket the size of the tenanted usage data into a number of additional hidden layers. In some implementations, a maximum number of hidden layers can be set to avoid excessive layering. As will be discussed, during fine tuning the method can further programmatically determine whether to fine tune all layers or only train the new layers based on the size of the tenanted usage data.

In some implementations, step 308 can also include setting other properties of the fine tuning process. For example, step 308 can also include setting the learning rate, batch size, and number of training epochs for the fine-tuning process. The learning rate controls the step size or rate at which the tenant model's parameters are updated during training. It determines how quickly or slowly the model learns from the new task or dataset. The batch size determines the number of samples processed together in each training iteration or mini-batch The number of training epochs represents the number of times the entire fine-tuning dataset is passed through the model during training. It determines how much exposure the model has to the new task or dataset. In some implementations, these hyperparameters can be similarly selected based on a grouped size of the tenant usage data.

In some implementations, the method can further include determining which layers must be "frozen." As used herein, a frozen layer refers to a layer that is not updated during training and thus the weights and biases are unchanging during training runs. In some implementations, this selection can again be based on the size of the tenanted usage data. For example, if the volume or size of the tenanted usage data is high, the method may determine that re-training copied layers would be too time consuming and thus ineffective. It may thus freeze some of all of these layers (based on how large the size is) and only train the newly added layers.

In step 310, the method can include initializing the subset of layers of the tenant model using corresponding predictive and semantic model layers.

As discussed above, at least one layer of the predictive model can be copied to the tenant model. As part of this process, the method can initialize the weights of the layer in the tenant model by, for example, copying the weights from the corresponding layer in the predictive model. In some implementations, the method can do this step for multiple layers in the tenant that have corresponding predictive model layers.

In conjunction with this weight initialization, the method can further influence the bias of one or more of the initialized layers using the semantic model. In some implementations, this influencing can be done in different manners based on the underlying models. As a first example, the bias values of neurons in an initialized layer can be directly updated by utilizing the bias of corresponding neurons of the semantic model. Specifically, the bias term of a given fully connected layer in a multilayer perceptron network can be replaced with the bias term of the corresponding semantic layer. Such an approach may be utilized when there is a strong connection between the semantic and predictive models.

As a second example, initialized layer can be combined or blended with the semantic layer. In this manner, the weights (and biases) of the copied predictive layer are unchanged, but the semantic layer is added in conjunction with the predictive layer. For example, the semantic layer can be included before or after the predictive layer to influence the inputs or outputs, respectively, of the predictive layer. Since the semantic layer represents the meaning of an input vector (e.g., query), the corresponding output vector represents the same meaning of the input and could thus be used as a pre-layer before the predictive layer is executed. Thus, the predictive layer's input would be enriched by the semantic meaning applied due to the use of the semantic layer.

In step 312, the method can include fine tuning the tenant model using tenanted usage data.

In this step, the method trains, or re-trains, the layers of the tenanted usage data. Specific details on how to train a neural network are not provided for the sake of brevity and generally any technique for training a neural network can be used. For example, the method can include a well-defined loss function (e.g., mean squared error or cross-entropy) to evaluate the performance of a training run and utilize backpropagation to update the weights and biases of each neuron.

In contrast to standard training of models, step 312 may adjust the training process based on the topology of the model and the tenanted usage data. As discussed, the tenant model includes pre-trained layers and untrained layers. As used herein, an "untrained" layer means a layer that has its parameters initialized to an arbitrary state for training (e.g., random values). In some implementations, the method can fully train the untrained layers using a loss function and backpropagation. Notably, however, the tenant model includes various transferred layers. In some implementations, the method can simply include the parameters of these transferred layers in the training process. However, in some implementations, this may lead to undesirable outcomes. Primarily, the re-training of existing layers may add unnecessarily delay to the training process with little improvement in model performance. In these scenarios, the method can selectively "disable" updates to the "frozen" layers (discussed above). Thus, during backpropagation, updates to the parameters can be disable and the layers effectively are unchanged while unfrozen layers are trained. In some implementations, this approach can result in a faster training process whereby untrained layers are fully trained and the knowledge in frozen layers is re-utilized.

In some implementations, the choice of how many layers to freeze can be made based on the size of the tenanted usage data. If a small dataset is used, the method may unfreeze all layers since the training time is likely unaffected. However, if a large dataset is used, the method may freeze some or all the transferred layers to avoid excessive training time.

In step 314, the method can include generating and storing embeddings using the fine-tuned tenant model.

In some implementations, the tenant usage model takes a query embedding and generates an action embedding (e.g., a search result or action thereon) as an output. In some implementations, during training the method may utilize a subset of all available query/action pairs. In this scenario, the method can input the remaining pairs into the trained tenant model generate action embeddings. The method can then persist the query and action embeddings in an embedding database for later indexing. No limit is placed on the number of embeddings that can be stored in this manner. In some implementations, the query and result/action embeddings are stored in a vector space to enable searching based on an input embedding (e.g., query embedding).

In some implementations, this vector space can be indexed for faster retrieval. In some implementations, an approximate nearest neighbor (ANN) search algorithm can be used as an indexing algorithm. ANN search allows for efficient similarity-based retrieval by finding the nearest neighbors to a given query embedding in a high-dimensional space. In some implementations, k-d trees, ball trees, or locality-sensitive hashing (LSH) can be used as an index structure, although alternative structures can be used. During search, discussed next, a search engine can then utilize the nearest neighbor search algorithm provided by the index structure to find the closest embeddings (search results) to the query embedding.

In addition to the foregoing, the method can optionally be extended to generate user profile embeddings. User profile embeddings capture the preferences, behavior, or characteristics of individual users, allowing for personalized recommendations or tailored search results. To generate user profile embeddings, the following steps can be considered. First, the method can collect user interaction data, such as click-through data, search history, ratings, or any other relevant user behavior information. In some implementations, the user interaction data can be included as additional input to the MLP model during training. For example, input vectors can be augmented with user-specific features or user identifiers to create a joint representation. This joint representation can aid in capturing user-specific preferences or behaviors, enhancing the model's ability to generate personalized embeddings. As an alternative, a separate model can be used to generate user profile embeddings based on the user interaction data. Such embeddings can represent the latent features or characteristics of individual users. In these examples, the index can be updated to incorporate the user profile embeddings as reference points in the index, allowing for personalized search and recommendation queries. That is, when a user initiates a search query or requests recommendations, a search engine can combine their query embedding with their corresponding user profile embedding and then utilize the nearest neighbor search algorithm on the updated index to retrieve search results or recommendations that are not only relevant to the query but also tailored to the user's preferences and behavior. By extending the method to generate user profile embeddings, the search engine can provide personalized search results or recommendations, enhancing the user experience and increasing engagement. This personalized approach considers individual user preferences, leading to more relevant and targeted results based on both the query and the user's profile.

FIG. 4 is a block diagram illustrating a method for identifying blended search results according to some of the example embodiments.

In step 402, the method can include receiving a search query.

In some implementations, an application can allow users to input text queries. The application may comprise a web, mobile, desktop, or similar type of application. No limit is placed on the type of search query or the content of the query. In some implementations, the application can receive the search query and transmit the search query to a search engine.

In step 404, the method can include generating a text embedding for the search query. This step can involve transforming the given search query, typically composed of textual data, into a numerical vector representation, also known as an embedding. The method can leverage a pre-trained language model or any other suitable transformer-based model, trained on a large corpus of text to understand linguistic nuances and context. The language model effectively maps the search query into a high-dimensional space, where each dimension captures different aspects of the query's semantics and syntax.

In step 406, the method can include querying an embedding index to generate vector search results.

In some implementations, the embedding index can be constructed from query, result/action, and user profile embeddings. In some implementations, the embedding index can index an embedding space that includes all three embedding types. In such an implementation, each embedding in the embedding space may be associated with a type (e.g., query, result, action, user profile).

In some implementations, the method can use only the query embedding as a query for the embedding index. In some implementations, the method can query the embedding index to identify the most similar result or action embeddings (e.g., based on cosine similarity, nearest neighbor etc.). In some implementations, the type of the embeddings in the embedding index can be used to filter the returned output embeddings.

In other implementations, the query embedding can be combined with a user profile embedding. This combined vector could be computed by averaging the query and user profile embeddings or can be computed using a more complex operation, such as a weighted sum based on the significance of each embedding. In some implementations, this combined embedding can then be used as a search embedding as discussed above.

In some implementations, the query to the embedding index can return a list of ranked result or action embeddings, from most relevant (e.g., nearest neighbor) to least relevant within a minimum relevancy threshold. In some implementations, the method can further include converting the ranked embeddings into text search results by reversing the embedding.

In some implementations, the result embeddings may include identifiers of search results. In this scenario, step 406 can further include resolving the embeddings to obtain details of the underlying results (e.g., documents). For example, the embedding may comprise an identifier of a webpage and the method can retrieve details of the webpage (for ultimate inclusion in the search results page).

In step 408, the method can include querying a document index to obtain search results.

In this step, the text of the search query (versus embedding) can be used to query a document index. Various techniques for querying a text index can be used and the specific examples herein are not limiting. As one example, the method an Okapi BM25 function to identify relevant documents for a given text query. The BM25 function ranks documents based on the query terms appearing in each document, considering the frequency of the terms in the document and the inverse frequency of the terms in the entire document collection. This step allows for the retrieval of relevant documents based directly on their textual content, which can then be further analyzed or processed as necessary. In some implementations, an index can be used to identify the candidate documents such as an inverted index, term-document matrix, n-gram index, etc.

In step 410, the method can include blending the vector results and the document results.

In some implementations, the search engine can return a results page that includes both results identified via embeddings and those identified via text searching. In some implementations, the method can interleave the results without an indication of the origin of the search results. In other implementations, the search results can be bifurcated, and each section can include corresponding document or embedding results. In some implementations, blending can include pre-processing the results to prioritize results returned from the embedding store versus results from the document index, or vice-versa. In some implementations, this percentage can be specified by the tenant or an administrator thereof. For example, a tenant may specify that only 10% of results be pulled from the embedding store. In this scenario, the method can only select a subset of the embeddings to include. In any scenario, both the results from the embedding store and the results from the document index can be normalized to be ranked on the same scale to facilitate comparisons among the results.

In step 412, the method can include presenting the blended search results. In some implementations, the search engine returns a final list of search results to the application. The application can then render a search results page including the search results. In some implementations, this search results page can include event handlers for monitoring for user interactions.

In step 414, the method can include recording interactions with the search results page.

In some implementations, these interactions can be used as training data, as discussed. In some implementations, the method can further include determining if interactions are with search results retrieved from the document index and only include such interactions (to avoid reinforcing embedding-related results). In some implementations, the interactions can be further stored to analyze the accuracy of the embedding-derived results. For example, aggregate statistics regarding how often users select a result generated by the embedding index can be compared to how often a user selects a result generated by the document index to determine whether the fine tuning of the model needs to be updated.

Figure 5:
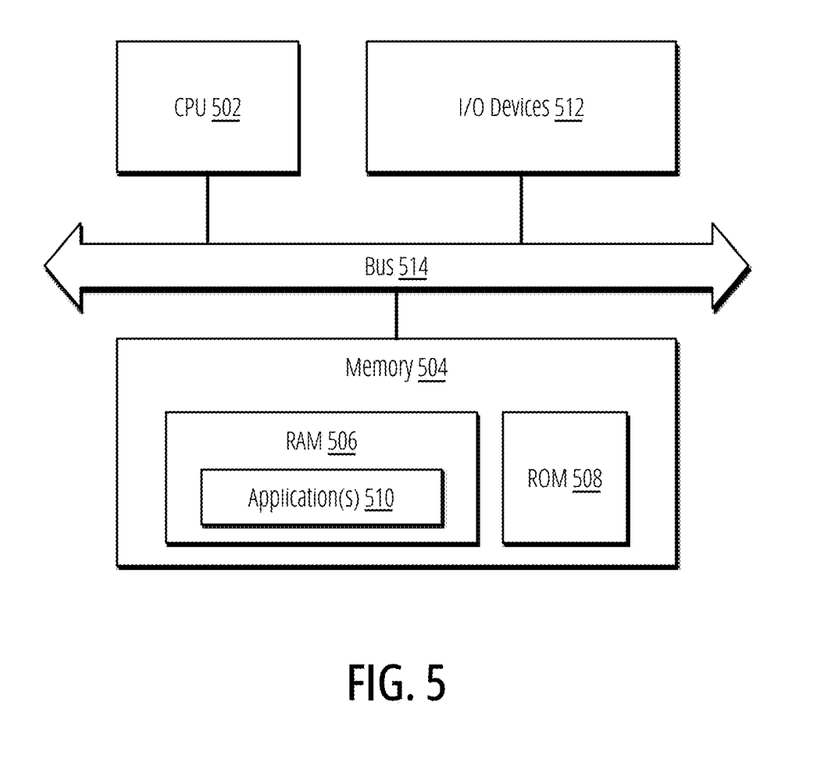
FIG. 5 is a block diagram of a computing device according to some embodiments of the disclosure.

FIG. 5 is a block diagram of a computing device according to some embodiments of the disclosure.

As illustrated, the device includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:
   loading, by a processor, a predictive model, the predictive model including a first set of hidden layers;
   loading, by the processor, a semantic model, the semantic model including a second set of hidden layers;
   generating, by the processor, a tenant model by combining the first set of hidden layers from the predictive model with a newly initialized third set of hidden layers, the third set of hidden layers receiving, as input, an output of the first set of hidden layers;
   loading, by the processor, a tenanted training data set comprising interactions of users with a network search application;
   training, by the processor, the tenant model by biasing the first set of hidden layers with the second set of hidden layers by adjusting bias terms of the first set of neural network hidden layers with corresponding bias terms of the second set of neural network hidden layers and training weights of at least the third set of hidden layers using the tenanted training data set; and
   building, by the processor, an embedding index using the tenant model.

2. The method of claim 1, wherein the tenanted training data set comprises a data set comprising interactions of users with a network search application.

3. The method of claim 2, wherein the interactions include search queries and corresponding selections of search results.

4. The method of claim 1, wherein biasing the first set of hidden layers with the second set of hidden layers comprises adjusting bias terms of the first set of hidden layers with corresponding bias terms of the second set of hidden layers.

5. The method of claim 1, wherein biasing the first set of hidden layers with the second set of hidden layers comprises combining the second set of hidden layers with the first set of hidden layers.

6. The method of claim 1, further comprising analyzing a size of the tenanted training data set and determining which layers in the tenant model to re-train based on the size of the tenanted training data set.

7. The method of claim 6, wherein training the tenant model further comprises re-training the first set of hidden layers when the size is below a threshold.

8. The method of claim 1, further comprising:
   receiving a search query;
   converting the search query to a search embedding;
   building a search embedding from the search query;
   identifying similar embeddings stored in the embedding index;
   querying a document index using the search query to identify responsive documents; and
   returning a set of search results selected from the similar embeddings and responsive documents.

9. A non-transitory computer-readable storage medium for tangibly storing computer program instructions capable of being executed by a computer processor, the computer program instructions defining steps of:
   loading a predictive model, the predictive model including a first set of hidden layers;
   loading a semantic model, the semantic model including a second set of hidden layers;

generating a tenant model by combining the first set of hidden layers from the predictive model with a newly initialized third set of hidden layers, the third set of hidden layers receiving, as input, an output of the first set of hidden layers;

loading a tenanted training data set comprising interactions of users with a network search application;

training the tenant model by biasing the first set of hidden layers with the second set of hidden layers by adjusting bias terms of the first set of neural network hidden layers with corresponding bias terms of the second set of neural network hidden layers and training weights of at least the third set of hidden layers using the tenanted training data set; and building an embedding index using the tenant model.

10. The non-transitory computer-readable storage medium of claim 9, wherein the tenanted training data set comprises a data set comprising interactions of users with a network search application.

11. The non-transitory computer-readable storage medium of claim 10, wherein the interactions include search queries and corresponding selections of search results.

12. The non-transitory computer-readable storage medium of claim 9, wherein biasing the first set of hidden layers with the second set of hidden layers comprises adjusting bias terms of the first set of hidden layers with corresponding bias terms of the second set of hidden layers.

13. The non-transitory computer-readable storage medium of claim 9, wherein biasing the first set of hidden layers with the second set of hidden layers comprises combining the second set of hidden layers with the first set of hidden layers.

14. The non-transitory computer-readable storage medium of claim 9, further comprising analyzing a size of the tenanted training data set and determining which layers in the tenant model to re-train based on the size of the tenanted training data set.

15. The non-transitory computer-readable storage medium of claim 14, wherein training the tenant model further comprises re-training the first set of hidden layers when the size is below a threshold.

16. The non-transitory computer-readable storage medium of claim 9, the steps further comprising:
receiving a search query;
converting the search query to a search embedding;
building a search embedding from the search query;
identifying similar embeddings stored in the embedding index;
querying a document index using the search query to identify responsive documents; and
returning a set of search results selected from the similar embeddings and responsive documents.

17. A device comprising:
a processor; and
a storage medium for tangibly storing thereon logic for execution by the processor, the logic comprising instructions for:
loading a predictive model, the predictive model including a first set of hidden layers;
loading a semantic model, the semantic model including a second set of hidden layers;
generating a tenant model by combining the first set of hidden layers from the predictive model with a newly initialized third set of hidden layers, the third set of hidden layers receiving, as input, an output of the first set of hidden layers;
loading a tenanted training data set; comprising interactions of users with a network search application
training the tenant model by biasing the first set of hidden layers with the second set of hidden layers by adjusting bias terms of the first set of neural network hidden layers with corresponding bias terms of the second set of neural network hidden layers and training weights of at least the third set of hidden layers using the tenanted training data set; and
building an embedding index using the tenant model.

18. The device of claim 17, wherein biasing the first set of hidden layers with the second set of hidden layers comprises adjusting bias terms of the first set of hidden layers with corresponding bias terms of the second set of hidden layers.

19. The device of claim 17, wherein biasing the first set of hidden layers with the second set of hidden layers comprises combining the second set of hidden layers with the first set of hidden layers.

20. The device of claim 17, further comprising analyzing a size of the tenanted training data set and determining which layers in the tenant model to re-train based on the size of the tenanted training data set.

* * * * *